April 1, 1969 L. HUNKEL 3,435,993
HOPPER WITH VIBRATORY MEANS FOR UNIFORM RATE OF MATERIAL DELIVERY
Filed April 26, 1967

INVENTOR,
LUDWIG HUNKEL

April 1, 1969 L. HUNKEL 3,435,993
HOPPER WITH VIBRATORY MEANS FOR UNIFORM RATE OF MATERIAL DELIVERY
Filed April 26, 1967
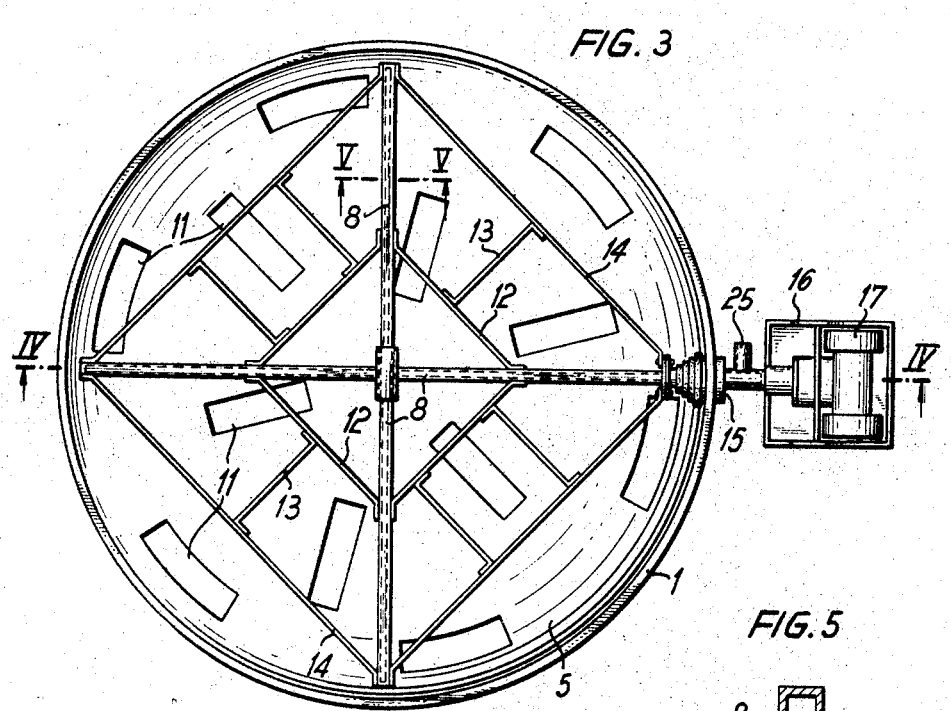
FIG. 3
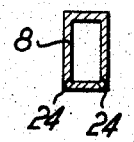
FIG. 5
FIG. 4
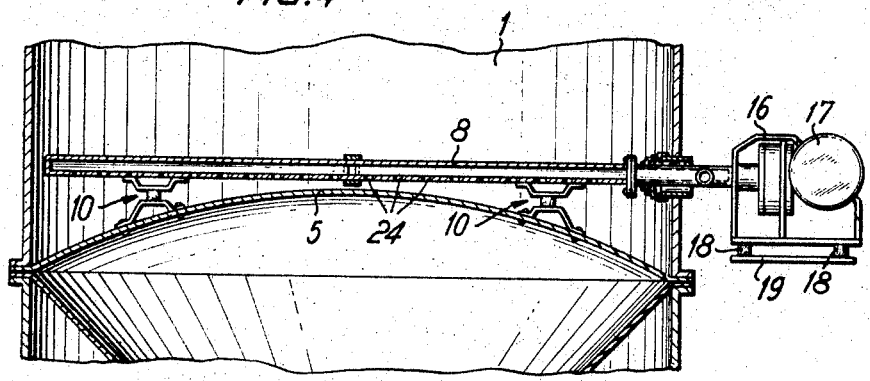
INVENTOR,
LUDWIG HUNKEL

United States Patent Office 3,435,993
Patented Apr. 1, 1969

3,435,993
HOPPER WITH VIBRATORY MEANS FOR UNIFORM RATE OF MATERIAL DELIVERY
Ludwig Hunkel, 3 Ostendstrasse, 6079 Sprendlingen, Hesse, Germany
Filed Apr. 26, 1967, Ser. No. 634,001
Claims priority, application Germany, May 5, 1966, H 59,311
Int. Cl. B65g 65/70; G01f 11/46
U.S. Cl. 222—195    6 Claims

ABSTRACT OF THE DISCLOSURE

Delivery means are provided for discharging a loose bulk material at a steady rate of discharge from a hopper. An apertured intermediate plate is located above the outlet cone of the hopper and skeletal frame shakers for controlling the flow of the discharging material are located directly above such plate. The shaker is selectively used and comprises a flat spoke-like grating extending substantially across the entire area of the plate. The grating includes spokes which have outlets for compressed air and means are provided for vibrating the grating in a horizontal plane, which means are located outside of the hopper and vibration absorbing means are provided between the hopper, intermediate plate and the vibrating means.

---

Figure 1:
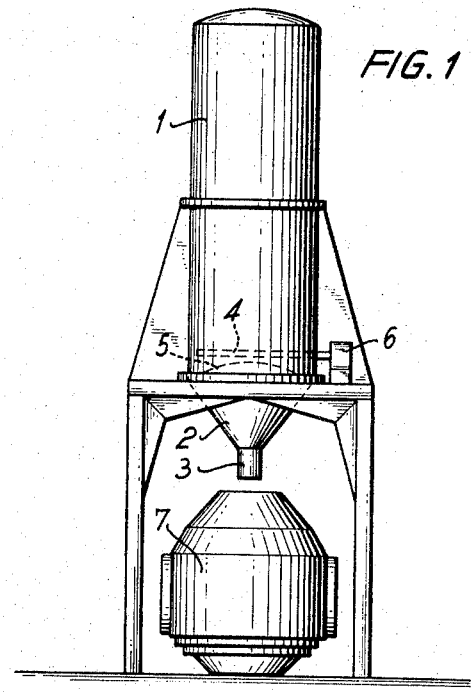

The invention relates to delivery means for discharging loose bulk materials from a hopper at a uniform rate. When a free flowing dry bulk material, a pulverulent chemical, cement, a washing powder, soda or the like, is discharged from a hopper through an outlet cone, a funnel-shaped bank of material usually remains behind in the hopper as the material runs out. Apart from leading to the undesirable result of later charges of material being delivered before all the material of a previous charge has been emptied, the formation of such a funnel also results in some of the material tending to stick to the hopper wall and to form a solid cone-shaped shell. Although such a shell can be removed by vibrators provided on the hopper wall or in the outlet cone the sudden collapse of the funnel or of part of the same prevents the material from being delivered at a steady and uniform rate.

An object of the invention is to ensure that a charge of material will descend uniformly within the entire hopper cross section without the provision of vibrators on the walls of the hopper or of the outlet cone and without thus incurring the undesirable results of sudden collapse.

A further object is to provide above the outlet cone a apertured intermediate plate and directly above the said plate a vibratory shaker in the form of a flat spoke-like grating substantially extending over the entire area of the intermediate plate and adapted to be vibrated in a horizontal plane, said shaker and its drive means outside the hopper being separated from the hopper by vibration-absorbing means. For the sake of improving its mechanical strength the apertured intermediate plate may have an upwardly arched convex conformation. The apertured intermediate plate prevents the discharging material from forming a hollow funnel and provides a large number of paths across the hopper cross section for the discharge therethrough of the flowing material and for ensuring a uniform rate of descent of the material inside the hopper. Consequently consecutive charges will be delivered sequentially, as is desired. Arch formations above the intermediate plate, which may appear more particularly when the discharge of the material is temporarily stopped can be rapidly removed by a brief operation of the shaker device.

A still further object is to mount the vibratory shaker itself so that it cannot transmit vibration to the actual hopper. This is desirable because shaking devices which act directly on the wall of the hopper or on the outlet cone to tend to pack the material above the intermediate plate more tightly than under the plate. The arrangement proposed by the present invention operates to ensure an uninterrupted discharge at a steady rate for accurate metering and therefore also reduces the wear to which a weigh feeder which may be provided in the outlet cone would otherwise be subjected. The vibration-absorbing mounting of the shaker and of its drive means in the hopper also ensures that the entire power of the drive means is transmitted to the shaker without imposing a mechanical vibratory load on the hopper itself.

A further object is to support the spark-like grating forming the shaker from the intermediate plate through interposed swing metal elements and horizontal reciprocatory vibrations may be imparted thereto by an out-of-balance motor. Alternatively, the shaker grating may be centrally attached to the intermediate plate and short horizontal rotary oscillations imparted thereto.

Figure 2:
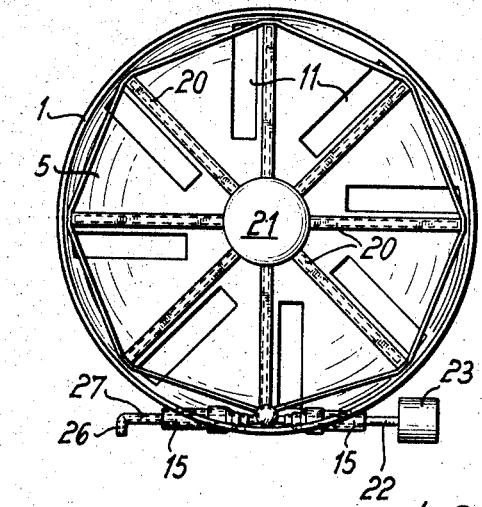

With the above and other objects in view which will become apparent from the detailed description below, two preferred embodiments of the invention are shown in the drawings in which:

FIGURE 1 is a schematic representation of the general construction of a hopper for loose bulk materials, provided with discharge means according to the invention, FIGURE 2 is a schematic plan view of an opened hopper fitted with a star-shaped vibratory shaker for performing rotary oscillations, FIGURE 3 is a schematic plan view of an opened hopper equipped with a rhomboidal shaker adapted to be reciprocably vibrated in a horizontal plane, FIGURE 4 is a vertical section taken on the line A–B in FIGURE 4, and FIGURE 5 is a vertical cross section of a single spoke of the shaker, the section being taken on the line C–D in FIGURE 3.

With reference to the embodiment illustrated in FIGURE 1 a hopper 1 with an outlet cone 2 containing a weigh feeder and discharging a feed through an outlet 3 is provided, located above an upwardly convex and apertured intermediate plate 5, with a vibratory shaker 4 of the kind proposed by the present invention, said shaker being associated with drive means 6 located outside the hopper. The hopper 1 discharges into a container 7 that has been pushed underneath the delivery end of the hopper.

As shown in greater detail in FIGS. 3, 4 and 5 the vibratory shaker may consist of a cross formed by hollow spokes of rectangular section according to FIGURE 5, the free peripheral ends of the spokes being provided with airtight closure means. At points 9 the spokes are supported from the intermediate plate 5 by interposed swing metal elements 10 which prevent vibratory energy from being transmitted to the intermediate plate. The crossing spokes 8 are so placed that the openings 11 in the perforated intermediate plate 5 are not masked by the spokes to avoid reducing the cross section of flow available to the feeding material. For the purpose of rigidifying the spokes 8 and for improving their shaking effect on the feeding material the spokes 8 are interconnected by a frame consisting of upended flat steel sections 12, 13 and 14 which combine to form a rhomboidal structure.

One of the spokes 8 passes through a bushing 15 in the wall of the hopper 1 to the outside and is coupled to the frame 16 of an out-of-balance motor 17. The frame 16 is supported by swing metal elements 18 from a platform 19 which may be bolted to the supporting structure, not shown, of the hopper. This method of mounting the motor ensures that the full vibratory energy will be transmitted to the shaker 4 without affecting the hopper 1.

In the embodiment illustrated in FIG. 2 a star-shaped shaker which is reciprocably rotatable within a small angular range is mounted in the hopper 1 above the intermediate plate 5 containing openings 11. The spokes 20 of this shaker likewise consist of up-ended rectangular tubular sections of the same kind as in FIGURE 5, but these spokes all radiate from a central hub 21 which is centrally rotatably mounted on a pivot bearing (not shown) preferably located below the intermediate plate 5. The free ends of the spokes 20 are interconnected by up-ended steel bands. This shaker can be rotatably oscillated within a limited amplitude by outside drive means 23 through a rod 22.

In both the above described embodiments any stoppage in the free flow of material through the intermediate plate is counteracted by a brief operation of the shaker. For completely discharging the hopper the spokes 8 or 20 respectively are provided on their undersides with holes 24 (FIG. 5) through which jets of compressed air or other aeriform fluid can be discharged obliquely onto the intermediate plate 5 underneath.. The compressed air is supplied through a branch pipe connection 25 at the end of the spoke 8 which extends to the outside in the case of the shaker shown in FIGS. 3 and 4, and through a compressed air connection 26 aligning with the rod 22 at the end of an air supply pipe 27 extending from the hopper to the outside in the case of the shaker shown in FIG. 2. In both embodiments the bushings through which the extended spoke 8 or the rod 22 and the air supply pipe 26 pass through the hopper wall 1 are surrounded by a resilient sealing sleeve 27. The bushings 15 are of sufficient width to provide sufficient clearance for the elements passing therethrough in any phase of operation, thereby to prevent any vibration from being transmitted to the hopper 1 itself.

As shown, the vibratory grating frame may consist of radial tubular members of rectangular section forming a cross or affixed in the manner of spokes to a central hub, the spokes being cross-braced by flat up-ended steel sections. The rectangular hollow sections and the up-ended flat steel sections have a scraping effect on the material above and assist in loosening it up. If the shaker comprises only a few spokes, such as four, the wider intervals between the spokes may be bridged by interposed flat steel sections placed with their edges at a suitable angle of attack in relation to the material, say at an angle of 45° in relation to the tubular spokes. In every embodiment the hollow spokes of the shaker should not mask the openings in the perforated intermediate plate, either when the shaker is at rest or when in operation, to avoid reducing the free cross section of flow through the openings.

The hollow spokes as shown have holes on their undersides through which jets of compressed air or other pressurized aeriform fluid may be directed obliquely against the intermediate plate primarily for the purpose of blowing residual material that may have been retained on the surface of the perforated plate at the end of discharge through the openings in the plate and out through the outlet cone, and of thus ensuring a complete discharge of the hopper. When the hopper is to be refilled such an arrangement permits even minor resides of material to be automatically removed from the hopper.

All the outside connections to the shaker—whether for transmitting the shaker drive or for supplying compressed air—pass through the hopper wall by being taken with clearance through the bushings inserted into the hopper wall and insulated therefrom by resilient sleeves.

I claim:

1. Delivery apparatus for discharging loose bulk material at a steady rate from and in combination with a supply hopper embodying an elongated upright hopper body having vertical side-walls and a relatively shorter outlet cone depending thereunder, comprising:

(a) an intermediate plate interposed between the lower end of the hopper body and the upper end of the outlet cone, said plate having a plurality of apertures therein to provide steady passage therethrough of the bulk material during discharge;

(b) a vibratory skeletal frame disposed horizontally in the lower end of said hopper body in superposed relation upon said intermediate plate;

(c) vibration absorbing means freely mounting said vibratory frame upon said intermediate plate in a manner to preclude transmitting any substantial vibratory motion of said skeletal frame to said plate and hopper body; and (d) drive means for selectively imparting vibratory motion in a horizontal plane to said vibratory skeletal frame without influencing said plate and said hopper.

2. Delivery apparatus as defined in claim 1 wherein the vibration absorbing means of paragraph (c) therein include a plurality of swing elements interconnecting said skeletal frame and said intermediate plate, and the means for imparting vibratory motion of paragraph (d) include an out-of-balance drive system means.

3. Delivery apparatus as defined in claim 1 wherein said skeletal frame includes a central pivotal mounting means to enable said frame to rotatably vibrate on the axis thereof coaxially with the vertical axis of the hopper body and closely adjacent above said intermediate plate.

4. Delivery apparatus as defined in claim 1 wherein the vibratory frame of paragraph (b) includes a plurality of interconnected, radially extended, hollow spoke elements constituting fluid passages and interconnected at a central axis coaxial with the vertical axis of the hopper when in a non-vibrating condition, and said frame spoke elements being substantially coextensive with substantially the whole cross-sectional area of the hopper body except for vibratory clearance thereof.

5. Delievry apparatus as defined in claim 4 wherein the spoke elements have closed fluid tight outer ends and downwardly angled apertures along the lower sides thereof in the direction of said plate apertures, and means connecting said spoke elements with a source of pressurized aeriform fluid to provide selective discharge of aeriform fluid jets therethrough directed towards said intermediate plate to facilitate completely emptying said hopper.

6. Delivery apparatus as defined in claim 5, wherein the means for imparting vibratory motion of paragraph (d) of claim 1 include an out-of-balance drive system having a drive motor exterior of the hopper body; the vibratory drive means and means for connecting with said source of pressurized fluid include connection means for the respective transmissions thereof, said respective connection means including connecting members and flexibly sealed bushing means including a tubular bushing in the lower wall of said hopper body and having a clearance diameter substantially larger than and disposed to receive therethrough the respective connection members.

References Cited

UNITED STATES PATENTS

| 7,555 | 3/1877 | Hull | 222—200 |
| 1,421,896 | 7/1922 | Benedict | 222—200 |
| 1,942,581 | 1/1934 | Tolman | 222—200 |
| 2,801,773 | 8/1957 | Vitkin | 222—200 |
| 3,166,222 | 1/1965 | Schrader | 222—195 |
| 3,261,508 | 7/1966 | Wahl | 222—199 |

WALTER SOBIN, *Primary Examiner.*

U.S. Cl. X.R.

222—200, 226